UNITED STATES PATENT OFFICE 2,322,322

DISCHARGE PRINTING OF TEXTILES

George W. Seymour and George C. Ward, Cumberland, Md., assignors to Celanese Corporation of America, a corporation of Delaware No Drawing. Application March 29, 1941,
Serial No. 385,852

6 Claims. (Cl. 8—64)

This invention relates to an improvement in the discharge printing of textile materials and relates more particularly to the formulation of printing pastes used in the discharge printing of fabrics dyed in dark shades with azo dyes so that more desirable illuminated discharge patterns may be obtained.

An object of our invention is the preparation of discharge printing pastes and the discharge printing, with said pastes, of fabrics dyed in dark shades with azo dyes to obtain clear, bright and sharp illuminated discharge patterns.

Another object of our invention is the preparation of discharge printing pastes and the production of clear, bright and sharp illuminated discharge patterns free of mottled effects.

Other objects of our invention will appear from the following detailed description.

The discharge printing of textile materials is widely used in the dyeing art for obtaining pattern effects on fabrics in a simple and economic manner. Generally, the fabric which is to be printed is dyed in the piece in a solid color by means of a suitable dyestuff to provide the color desired as the background. When the fabric is dyed with an azo dyestuff, a chemically active discharge paste, having a reducing action on the azo dye forming the background color, is applied to the fabric in a predetermined pattern and the fabric then treated so that the azo dye is reduced and split at the diazo group and the background color is removed at the points where the paste has been applied, yielding a white pattern or design upon a colored background. When it is desired to obtain a pattern or design in color instead of white, that is, an illuminated discharge print, it is preferable to apply, simultaneously with the destruction of the ground color, a dyestuff which is either resistant to reduction and is itself a dye for the fabric or one which can be reversibly oxidized after being vatted to the leuco form. In general, it is the vat dyestuffs which may be used for illumination since these dyestuffs are capable of being reversibly oxidized after being vatted. The vat dyestuffs may be applied to the fabric mixed in with the discharge paste and the method of application of the paste is similar to that where white discharges are obtained.

The discharge pastes heretofore employed in connection with azo-dyed fabrics for obtaining illuminated discharge patterns usually comprised a vat dyestuff for the print color, an alkali such as sodium or potassium hydroxide or carbonate for solubilizing the leuco vat dye and permit it to penetrate the fabric, a reducing agent for the dyes used both for the ground color and as the illuminant, generally a sulfoxylate formaldehyde such as sodium or potassium sulfoxylate formaldehyde, and when organic derivative of cellulose fabrics are treated, also preferably contains a swelling agent to permit better penetration of the fabric by the reducing agent, a thickener to keep the paste from spreading or creeping and enough water to make a thick paste. Illuminated discharge prints obtained on dark azo-dyed backgrounds by using discharge pastes containing the above-mentioned alkalis for solubilizing the vat dyestuffs were frequently unsatisfactory, however, since the color value of the discharge pattern obtained was poor, due to uneven penetration. This resulted in the presence of a halo of partially undischarged background color about the edges of the illuminated discharge pattern, and a mottled appearance in the print.

We have now discovered that if salts of an acid of phosphorus having a basic reaction are incorporated in discharge printing pastes containing vat dyes to solubilize said dyes, instead of the alkaline compounds heretofore incorporated therein, improved results are secured. The illuminated discharge patterns obtained by using these pastes are clear, bright and sharp, are unmottled, and the objectionable halo about the edges of the discharge pattern is no longer obtained.

The salts of the acids of phosphorus which may be added to the discharge printing pastes to solubilize the vat dyes are those which are basic in reaction and may be, for example, alkali metal salts of the phosphoric and phosphorus acids such as secondary and tertiary sodium orthophosphate, and secondary and tertiary potassium orthophosphate. While these phosphates are all suitable, we preferably employ tertiary sodium orthophosphate.

As a ground color, any suitable azo dyestuff may be used. Our invention is particularly of importance in connection with the illuminated discharge printing of fabrics which have been dyed with azo dyes which upon reduction by the discharge agent form products which are reasonably soluble in water.

The discharge paste may be locally applied to the fabric by any suitable means such as printing with embossed or engraved rollers, by stencilling or with blocks.

After the discharge paste is applied to the fabric by any one of the above methods or their equivalent, the fabric is then dried and aged in a suitable ager so that the background color will be acted upon by the reducing agent in the paste and the color destroyed. The continuous ager or cottage ager may be used and the ageing is generally carried out at about 98° C. to 101° C. for a period of time sufficient to discharge the azo dye. This period may be from about 10 to 20 minutes depending on the type of fabric and the particular dyestuffs used. The fabric is then washed to remove the decomposition products as completely as possible and to wash out the alkali metal phosphate so that the insoluble leuco vat is precipitated. The dye may then be oxidized from the leuco form by exposure to air or by an oxidizing bath. After a final wash with water the fabric is dried.

While our invention is applicable to the treatment of azo dyed textile materials generally, it is of particular importance with respect to fabrics or other textile material made of or containing yarns or filaments of an organic derivative of cellulose. As examples of such derivatives there may be mentioned cellulose esters, for example, cellulose acetate, cellulose propionate, cellulose butyrate, mixed esters such as cellulose acetate-propionate and cellulose acetate-butyrate, and cellulose ethers, for example, ethyl cellulose and benzyl cellulose. Mixed materials containing one or more of the aforementioned cellulose derivatives together with other textile fibers may likewise be treated in accordance with our invention. Such materials may contain, for instance, in addition to a cellulose ester or ether, cotton, wool, silk or a regenerated cellulose type of artificial silk.

In order to illustrate our invention but without being limited thereto the following examples are given:

Example I

A cellulose acetate fabric dyed with 4% or 4'-nitro-benzine-azo-2-amino-4-acetylamino-anisole is diazotized and coupled on the fabric with 4% of meta-di-hydroxyethyl-amino-acetanilide and then topped with 0.5% of p-nitrobenzene-azo-dioxyalkyl-m-toluidine, which topping yields a fabric of deep brown shade. The fabric is then printed with a discharge paste made up as follows:

| | Parts by weight |
|---|---|
| Indanthrene Golden Yellow GK (Schultz Farbstofftabellen 7th, volume 2, page 130) | 11 |
| Ponsol Flavone GC (a vat dye) | 11 |
| Ponsol Jade Green (Color Index 1101) | 2 |
| Sodium sulfoxylate formaldehyde | 20 |
| Sodium thiocyanate | 45 |
| Supertex gum | 96 |
| Sodium benzyl sulphanilate (Dissolving salt B) | 5 |
| Water | 64 |
| Tertiary sodium orthophosphate | 10 |

The printed fabric is then dried and aged in the rapid ager for 13 minutes at 99° C. to reduce the azo ground color. The reduction products are removed and the leuco vat dye precipitated by washing the fabric in an aqueous solution containing 2 grams per liter of sodium hydroxide. The fabric is then worked for 2 minutes in a bath containing 5 grams per liter of sodium perborate and 2 grams per liter of soap maintained at 50° C., thereby oxidizing the leuco vat dye in the discharge pattern. After a thorough rinsing in clear, cold water the fabric is dried and the resulting fabric has an apple green figure on a dark brown background. The printed pattern is distinguished for its sharpness, clearness and excellent color value, and for its freedom from any halo about the edges of the green figure.

Example II

A mixed cellulose acetate/viscose rayon fabric is dyed by known methods to a solid, dark brown shade with a dye composition comprising the following:

| | Parts by weight |
|---|---|
| Cibacete Discharge Blue 3GN | 0.5 |
| Dihalogenated-4-nitro-benzene-azo-dioxyalkyl-chloraniline | 0.35 |
| Celliton Discharge Yellow 3GN | 0.1 |
| Fastusol Blue LB | 0.3 |
| Fastusol Scarlet LB | 0.3 |
| Fastusol Yellow LRA (Color Index 349–a) | 1.0 |

After being dyed, the fabric is then printed with a discharge paste made up as follows:

| | Parts by weight |
|---|---|
| Sodium sulfoxylate formaldehyde | 10 |
| Sodium thiocyanate | 20 |
| Supertex gum | 35 |
| Water | 7 |
| Sodium benzyl sulfanilate | 3 |
| Tertiary sodium orthophosphate | 5 |
| Indanthrene Golden Yellow GK | 10 |

The printed fabric is then dried and aged in the rapid ager for 15 minutes at 99° C. to reduce the ground color. The fabric is then washed and the leuco vat oxidized as described in Example I. The resulting fabric has a yellow figure on a dark brown background and the printed pattern is sharp, clear and free of halo about the edges of the yellow figure.

It is to be understood that the foregoing detailed description is given merely by way of illustration and that many variations may be made therein without departing from the spirit of our invention.

Having described our invention, what we desire to secure by Letters Patent is:

1. Process for the production of illuminated discharge effects on an azo dyed textile material, which comprises locally applying to said dyed material a reducing discharge paste comprising a vat dyestuff and a salt of an acid of phosphorus having a basic reaction, subjecting the treated material to ageing, whereby said azo dye is decomposed by means of said paste, removing the decomposition products of said discharged azo dyestuff and subjecting said material to oxidation to illuminate the portions of the material printed with the vat dye.

2. Process for the production of illuminated discharge effects on an azo dyed textile material containing yarns of an organic derivative of cellulose, which comprises locally applying to said dyed material a reducing discharge paste comprising a vat dyestuff and a salt of an acid of phosphorus having a basic reaction, subjecting the treated material to ageing, whereby said azo dye is decomposed by means of said paste, removing the decomposition products of said discharged azo dyestuff and subjecting said material to oxidation to illuminate the portions of the material printed with the vat dye.

3. Process for the production of illuminated discharge effects on an azo dyed textile material containing yarns of cellulose acetate, which comprises locally applying to said dyed material a reducing discharge paste comprising a vat dyestuff and a salt of an acid of phosphorus having a basic reaction, subjecting the treated material to ageing, whereby said azo dye is decomposed by means of said paste, removing the decomposition products of said discharged azo dyestuff and subjecting said material to oxidation to illuminate the portions of the material printed with the vat dye.

4. Process for the production of illuminated discharge effects on an azo dyed textile material containing yarns of cellulose acetate, which comprises printing said dyed material in a predetermined pattern with a reducing discharge paste containing a vat dyestuff and an alkali metal salt of an acid of phosphorus having a basic reaction, subjecting the printed material to ageing so as to decompose said azo dyestuff by means of said discharge paste, washing said textile material to remove decomposition products of said discharged azo dyestuff and subjecting said material to oxidation to illuminate the portions printed with the vat dyestuff.

5. Process for the production of illuminated discharge effects on an azo dyed textile material containing yarns of cellulose acetate, which comprises printing said dyed material in a predetermined pattern with a reducing discharge paste containing a vat dyestuff and tertiary sodium orthophosphate, subjecting the printed material to ageing so as to decompose said azo dyestuff by means of said discharge paste, washing said textile material to remove decomposition products of said discharged azo dyestuff and subjecting said material to oxidation to illuminate the portions printed with the vat dyestuff.

6. Process for the production of illuminated discharged effects on an azo dyed textile material containing yarns of cellulose acetate, which comprises printing said dyed material in a predetermined pattern with a reducing discharge paste containing a vat dyestuff and tertiary potassium orthophosphate, subjecting the printed material to ageing so as to decompose said azo dyestuff by means of said discharge paste, washing said textile material to remove decomposition products of said discharged azo dyestuff and subjecting said material to oxidation to illuminate the portions printed with the vat dyestuff.

GEORGE W. SEYMOUR.
GEORGE C. WARD.